(12) United States Patent
Voser

(10) Patent No.: US 6,991,347 B2
(45) Date of Patent: Jan. 31, 2006

(54) CURRENCY ACCEPTOR, AND LIGHT SOURCE FOR USE THEREIN

(75) Inventor: Christian Voser, Satigny (CH)

(73) Assignee: Mars, Incorporated, McLean, VA (US)

( * ) Notice: Subject to any disclaimer, the term of this patent is extended or adjusted under 35 U.S.C. 154(b) by 0 days.

(21) Appl. No.: 10/316,781

(22) Filed: Dec. 11, 2002

(65) Prior Publication Data

US 2003/0117796 A1 Jun. 26, 2003

(30) Foreign Application Priority Data

Dec. 20, 2001 (EP) .................................. 01310679

(51) Int. Cl.
*F21V 9/00* (2006.01)

(52) U.S. Cl. ........................ 362/231; 362/240; 362/545

(58) Field of Classification Search ................ 362/555, 362/310, 800, 231, 250, 235, 351, 234, 240, 362/545; 356/71; 250/556; 194/207; 382/135–140
See application file for complete search history.

(56) References Cited

U.S. PATENT DOCUMENTS

| | | | |
|---|---|---|---|
| 3,910,701 A * | 10/1975 | Henderson et al. | 356/39 |
| 4,618,257 A * | 10/1986 | Bayne et al. | 356/71 |
| 6,178,014 B1 | 1/2001 | Copenhaver et al. | |
| 6,222,623 B1 * | 4/2001 | Wetherell | 356/236 |
| 6,234,648 B1 * | 5/2001 | Borner et al. | 362/235 |

FOREIGN PATENT DOCUMENTS

| EP | 1 081 660 A2 | 3/2001 |
|---|---|---|
| EP | 1 103 759 A2 | 5/2001 |

* cited by examiner

*Primary Examiner*—Sandra O'Shea
*Assistant Examiner*—Guiyoung Lee
(74) *Attorney, Agent, or Firm*—Fish & Richardson P.C.

(57) ABSTRACT

A multi-wavelength light source for use in a banknote validator comprises a housing containing a plurality of LEDs and a window for releasing light emitted by the LEDs. Visible wavelengths have a direct path to a diffuser located in the window. Infra-red wavelengths have to be diffusively reflected by the interior of the housing before they reach the diffuser, and thereby suffer greater attenuation that the visible wavelengths. The diffuser acts as a substantially point-like light source.

9 Claims, 3 Drawing Sheets

CURRENCY ACCEPTOR, AND LIGHT SOURCE FOR USE THEREIN

This invention relates to currency validators generally, and in particular to light sources which illuminate articles of currency, such as banknotes, so that their reflectivity and/or transmissivity in respective wavelengths can be measured at different regions on the articles in order to classify and authenticate the articles.

Such arrangements are well known in the art. It is common to have a light source in the form of a group of light-emitting diodes (LEDs) which emit light of different wavelengths, and to operate the LEDs in succession in order to test a banknote's optical characteristics in respective wavelengths.

One problem is that the intensity of the light output from the LEDs can be very different for different wavelengths. This is particularly a problem if the same sensor is used to detect light emitted by LEDs of different wavelengths, because it is difficult to obtain a sensor with response characteristics of a sufficiently wide dynamic range to cope with all the intensities without sacrificing resolution.

One way of dealing with this problem is to adjust the current supplied to the LEDs in order to make the emitted intensities more similar.

An aspect of the present invention is directed to a different technique which avoids or reduces the need to use current control for rendering the intensities more uniform, and which allows high intensity outputs from the LEDs.

It is known in the prior art to provide a substantially point-like light source to permit accurate focussing of the light on an article. One technique involves using a plurality of LEDs to illuminate an internal diffusing surface of a sphere, the light being emitted by a small window in the sphere. This has the advantage of combining the light produced by more than one emitter, but has the disadvantage that, because of the relatively small window size, the efficiency of the source is very low.

Another aspect of the invention is intended to provide a more efficient point-like light source.

Aspects of the present invention are set in the accompanying claims.

According to a further aspect of the invention, a multi-wavelength light source for use in a banknote acceptor comprises a housing containing a plurality of light emitters, such as LEDs, and having a window for releasing light emitted by the emitters, wherein the light paths from the emitters to the window are such that the light from at least one of the emitters is attenuated to a substantially greater degree than the light from another of the emitters of a different wavelength.

In a preferred embodiment, most or all the light from at least one LED (for example an infra-red LED) can reach the window only after being reflected within the housing, and therefore being attenuated as a result of the reflection. On the other hand, a substantial proportion, or all, the light from other LEDs, for example LEDs of visible wavelengths, can reach the window by a direct path and therefore is not attenuated to the same degree. This means that the current supplied to the infra-red LED does not need to be reduced to a large extent in order to reduce its intensity, which, it has been found, can lead to a reduction in the lifetime of the LED.

Preferably, the housing is, at least on an inner surface, diffusively reflective so that light can reach the window by reflections from this surface.

Preferably, a diffuser is provided to diffuse the light released from the window.

According to a still further aspect of the invention, a diffuser receives light from a plurality of emitters and constitutes a substantially point-like secondary light source. Preferably, the emitters emit light of different wavelengths. Preferably at least one emitter can directly illuminate the diffuser. This aspect provides a multi-emitter light source of good efficiency.

Arrangements embodying the invention will now be described by way of example with reference to the accompanying drawings, in which.

Figure 1:
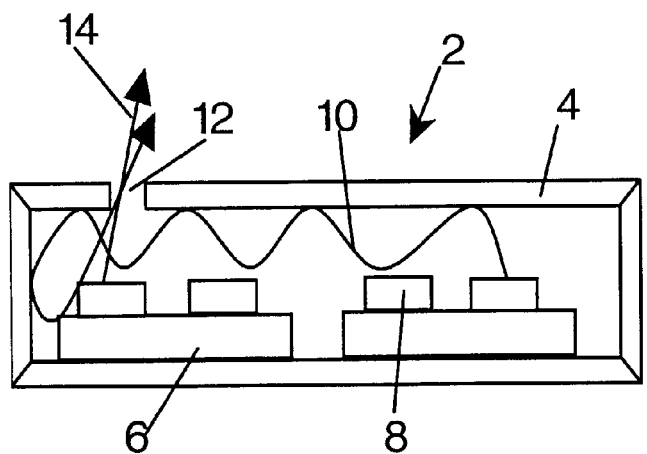
FIG. 1 is a schematic, cross-section view of a light source in accordance with the present invention.

Referring to FIG. 1, a light source 2 comprises two integrated circuits, or packages, one of which is indicated at 6, which are housed in a light mixing box 4. Each package carries three LED dies, one of which is indicated at 8. All the LEDs are of different wavelengths, so that there are six different wavelengths in total. The light from the LEDs emerges from a single small aperture 12, forming a secondary point-like light source.

It is known that LEDs of different wavelengths emit light at different intensities. For example, infra-red LEDs emit at a higher intensity than LEDs in the visible range. The arrangement of FIG. 1 involves positioning the high-intensity emitters more distant from the aperture 12 than the low-intensity emitters, so there is effectively achieved a substantial normalisation of the intensities. Thus, for example, the light emitted from the infra-red LED will have to travel via a longer path, and suffer greater attenuation, as indicated by the light ray 10, than the light from the green LED, as indicated by the ray 14. This contrasts with prior art arrangements in which normalisation of intensity is achieved either by reducing the power supply to LEDs of particular wavelengths, or using a larger number of LEDs of lower intensity (although such measures could be additionally used in arrangements of the present invention).

Figure 2:
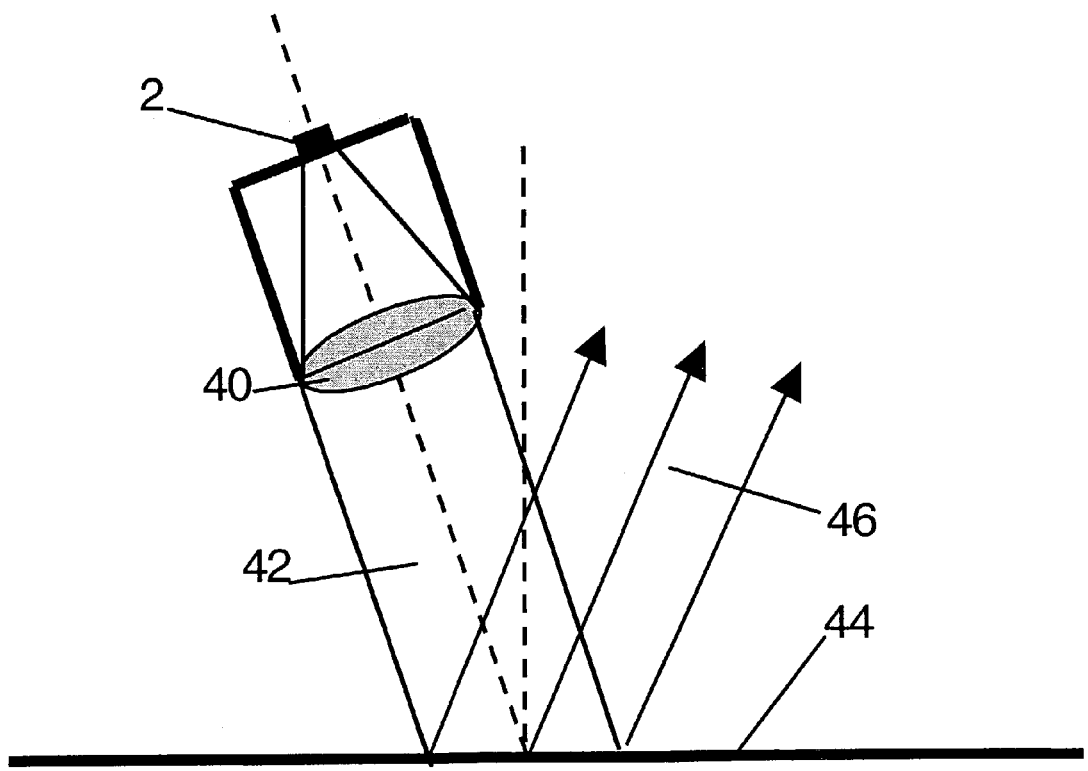
FIG. 2 illustrates part of a banknote acceptor incorporating the light source of FIG. 1.

Referring to FIG. 2, the light source 2 for is located at the focal point of a lens 40, so that a collimated multi-wavelength beam 42 illuminates a banknote 44. This means that specularly reflected light 46 travels in a confined beam. Accordingly, a sensor (not shown) can be positioned so as to receive diffusely reflected light (or transmitted light) while avoiding specularly reflected light, which has been found to cause unrepresentative measurements. The arrangement can be improved by providing a diffuser in, or just above or below, the window 12, so that the distribution of different wavelengths is rendered more uniform. The direct illumination of the window 12 (or diffuser) results in a relatively large output, and thus a relatively efficient light source.

The lens 40 may alternatively be arranged to focus an image of the light source 2 on the banknote 44.

Figure 3:
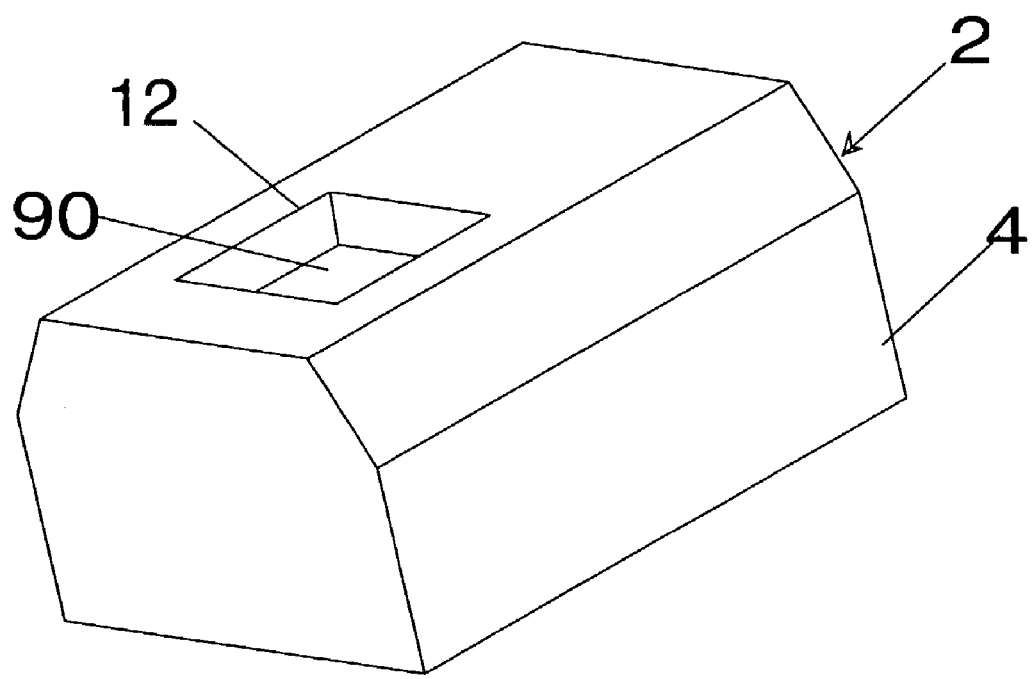
FIG. 3 is a perspective view of another embodiment of a light source in accordance with the invention.
Figure 4:
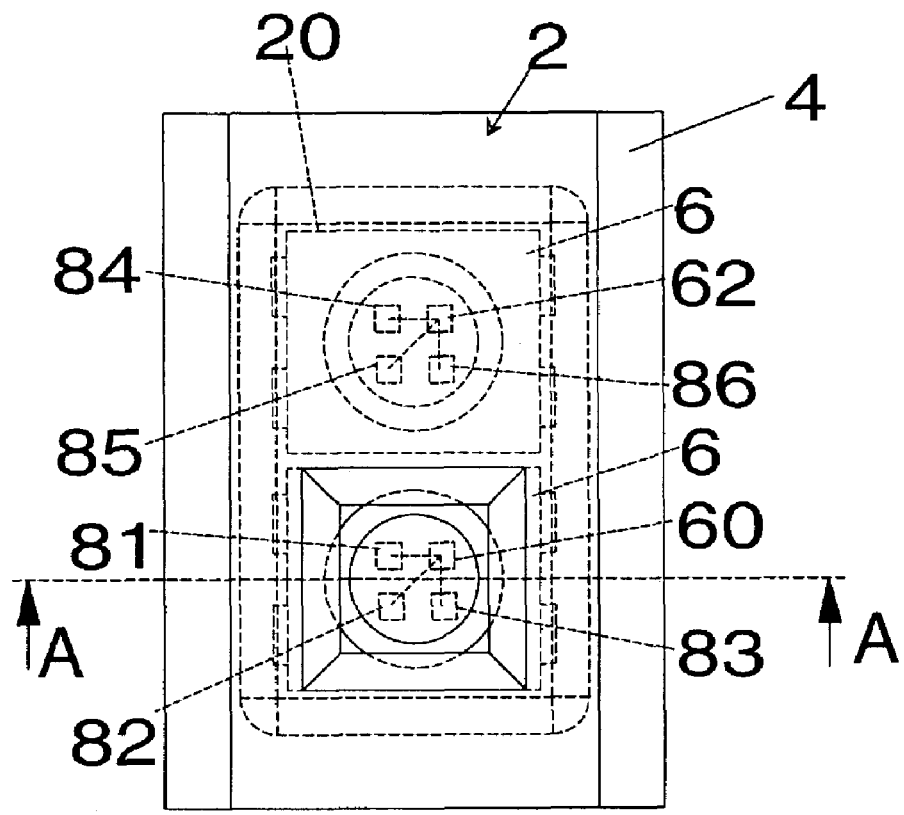
FIG. 4 is a plan view of the sensor of FIG. 3.
Figure 5:
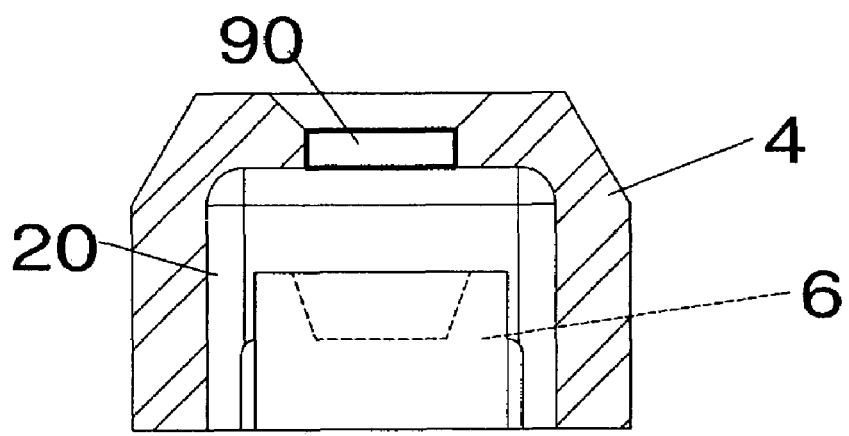
FIG. 5 is a cross-section along line A—A of FIG. 4.

Referring to FIGS. 3 to 5, these show a second embodiment of the light source 2 which can be alternatively used in the arrangement of FIG. 2. This embodiment also includes a housing 4 having a window 12. In this case, the housing has no base, because the light source is mounted on a PCB (not shown). The housing 4 is made of a thermoplastic polyester, for example Pocan (registered trade mark), which has good diffuse reflectivity enabling the interior surface 20 to reflect light emitted by the LEDs.

The housing contains two packages 6. One of them carries three LEDs, 81, 82, 83, which are located directly beneath the rectangular window 12 and connected to a contact pad 60. The LEDs 81, 82 and 83 emit light of visible wavelengths (for example red, green and blue, respectively). The other package 6 carries three LEDs 84, 85 and 96, of different infra-red wavelengths, connected to a contact pad 62 and positioned away from the region of the window 12.

A diffuser 90 is mounted within the window 12 to act as a secondary light source.

This embodiment operates similarly to the embodiment of FIG. 1, in that the visible wavelengths have a direct path to the window 12, whereas the most of the infra-red light can reach the window only by diffuse reflection from the interior wall 20 of the housing 4. Accordingly, the infra-red wavelengths are attenuated to a significantly larger extent than the visible wavelengths, (although some of the infra-red light may be able to reach the window 12 directly).

It will be appreciated from the foregoing that the term "light" is used herein to refer not merely to visible wavelengths but also to other wavelengths in the electromagnetic spectrum.

What is claimed is:

1. An apparatus comprising a currency validator that comprises a multi-wavelength light source for illuminating a currency article, the source comprising a housing containing a plurality of LEDs and having a window for releasing light emitted by the LEDs, wherein the light paths from the LEDs to the window differ such that light from at least one LED is attenuated to a greater extent than light from at least one other LED of a different wavelength.

2. The apparatus of claim 1, wherein light from said at least one LED can reach the window by diffuse reflection by an inner surface of the housing.

3. The apparatus of claim 1 or claim 2, wherein said at least one LED emits infra-red light, and said at least one other LED emits light of a visible wavelength.

4. The apparatus of claim 1 wherein the light source includes a diffuser arranged to diffuse light released by the window.

5. An apparatus comprising a currency validator that comprises a light source for illuminating a currency article, the source comprising a plurality of LEDs and a diffuser receiving light emitted by the LEDs and forming a substantially point-like secondary light source, wherein the light paths from the LEDs to the diffuser differ such that light from at least one LED is attenuated to a greater extent than light from at least one other LED of a different wavelength.

6. The apparatus of claim 1, wherein at least one of the LEDs is arranged to directly illuminate the diffuser.

7. The apparatus of claim 6, wherein said one LED emits light of a visible wavelength.

8. The apparatus of claim 1, wherein the light source includes a collimating lens for producing a collimated light beam from the source.

9. The apparatus of claim 5, wherein the LEDs emit light of different wavelengths.

* * * * *